United States Patent [19]
Mark et al.

[11] Patent Number: 5,485,273
[45] Date of Patent: Jan. 16, 1996

[54] RING LASER GYROSCOPE ENHANCED RESOLUTION SYSTEM

[75] Inventors: John G. Mark, Pasadena; Daniel A. Tazartes, West Hills; Robert E. Ebner, Tarzana, all of Calif.; Neal J. Dahlen, Freiburg, Germany; Nibir K. Datta, West Hills, Calif.

[73] Assignee: Litton Systems, Inc., Woodland Hills, Calif.

[21] Appl. No.: 690,174

[22] Filed: Apr. 22, 1991

[51] Int. Cl.$^6$ .................................................. G01B 9/02
[52] U.S. Cl. .................................................. 356/350
[58] Field of Search .................................................. 356/350

[56] References Cited

U.S. PATENT DOCUMENTS

| | | | |
|---|---|---|---|
| 4,533,250 | 8/1985 | Callaghan | 356/350 |
| 4,634,283 | 1/1987 | Mark et al. | |
| 4,791,460 | 12/1988 | Bergstrom | 356/350 |
| 4,818,087 | 4/1989 | Dorschner | 350/622 |

Primary Examiner—Mark Hellner
Attorney, Agent, or Firm—L. David Rish; James F. Kirk; Chester E. Martine, Jr.

[57] ABSTRACT

Disclosed herein is a Ring Laser Gyroscope Enhanced Resolution System comprising, in a preferred embodiment, a sampling frequency modulation phase-locked loop (or "chirp") which is used in combination with the fast filter. Enhanced resolution is achieved by using the fast filter (preferably a moving average digital filter) to gather optically integrated rate data and accumulate this data. During the data gathering process, the accumulated data is sampled at a rate set by a frequency modulated ("chirper") phase-locked loop in order to remove undesirable data due to aliasing effects upon the digital filter. In this manner, an enhanced resolution of the gyroscope angular measurement is achieved.

19 Claims, 10 Drawing Sheets

RING LASER GYROSCOPE ENHANCED RESOLUTION SYSTEM

BACKGROUND OF THE INVENTION

1. Field of the Invention

This invention pertains to the improvement of the resolution of processed electronic data delivered from the heterodyne detectors of ring laser gyroscopes or angular rate sensors, and more particularly to enhanced resolution multioscillator ring laser gyroscopes.

2. Description of Related Art

Ring laser angular rate sensors generally comprise a ring laser within a monolithic solid block defining a ring-shaped conduit which contains an active region stimulated laser gas. Within the optical pathway of the gyroscope at least two laser beams counterpropagate in clockwise and anti-clockwise directions around the ring pathway. Over the past twenty years, the gaseous medium planar ring laser gyroscope has been developed and evolved as a reliable and relatively environmentally insensitive inertial rotation sensor. Planar ring laser gyroscopes, of both triangular and square geometries, have been used in inertial navigation systems and flight control systems regularly in both commercial and military aircraft. The primary advantage of the ring laser gyroscope over the spinning wheel mechanical gyroscope is its ability to withstand relatively large mechanical shock without permanent degradation of its performance. Because of this and other features, the expected mean time between failures of most ring laser gyroscope inertial navigation systems is several times longer than the mechanical gyroscope systems they replace.

The planar ring laser gyroscope was a first attempt at a non-mechanical truly strap-down inertial navigation system. At low rotation rates, the retroscatter from the mirrors couples energy from one of the oscillating beams into the oppositely propagating beam which locks the oscillating frequencies together yielding zero rotation information at low rotation rates. Current operational ring laser gyroscopes having a planar configuration use mechanical dithering schemes to bias the rate sensor to avoid this well known lock-in phenomenon. Mechanical dither is very effective in reducing the effects of lock-in and makes the ring laser gyroscope a viable navigational gyroscope. However, an effective mechanically dithered ring laser gyroscope adds a noise component to the output of the ring laser which in turn reduces its ultimate accuracy. Also, the presence of mechanical dither, either in the mirrors or full body dither, detracts from the desired goal of a fully strapped down inertial navigational unit.

With these problems in mind, alternative biasing techniques have been developed using the nonreciprocal Faraday effect by either applying a magnetic field to a magnetic mirror (using the Kerr effect) or directly to the gain medium (using the Zeeman effect), or to a solid glass element known as a Faraday rotator, which when used in combination with the magnetic field, provides a Faraday effect phase shift for one beam that is opposite the phase shift of the oppositely directed beam whereby two counter rotating beams are split in frequency. To achieve actual phase shifts instead of simple polarization rotation, two pairs of oppositely directed circularly polarized beams are optimally present within a single optical path to achieve a desired result. An example of this theory of multioscillator ring laser gyroscope may be found in U.S. Pat. No. 4,818,087 entitled "ORTHOHEDRAL RING LASER GYRO" issued Apr. 4, 1989 to Raytheon Corporation (Terry A. Dorschner, inventor). The nonplanar ray path produced in a multioscillator ring laser gyroscope ensures circular polarized reciprocally split light. The nonplanar ray path reciprocally rotates the polarizations by many degrees yielding the necessary circular polarization. The nonplanar reciprocal phase shift also achieves two Faraday bias gyroscopes, the gain curve G of which is illustrated in FIG. 1B. The nonplanar ray path splits the light through its geometry into two separate gyroscopes, one being left circularly polarized and the other right circularly polarized. This splitting is known as reciprocal splitting and typically is in the range of 100's of MHz. By placing a Faraday element in the beam path of a nonplanar ring laser gyroscope, when the proper magnetic field is applied to the Faraday element, nonreciprocal splitting of each gyroscope is achieved. At least four modes are produced: a left circularly polarized anti-clockwise beam ($L_a$), a left circularly polarized clockwise beam ($L_c$), a right circularly polarized clockwise beam ($R_c$), and a right circularly polarized anti-clockwise beam ($R_a$). The Faraday splitting between clockwise and anti-clockwise modes is about 1 MHz. At least four mirrors form the ring resonator path, which contains the two gyroscopes symbolized by their respective gain curves of FIG. 1B. One of the mirrors is slightly transmissive to allow light to leave the resonator and impinge upon a photo detector for signal processing. When the signals are processed electronically to remove the Faraday bias, the scale factor of the gyroscope is doubled over the conventional ring laser gyroscope. The nonplanar geometry multioscillator ring laser gyroscope using a Faraday element is currently manufactured using a gas discharge pump to provide the active medium, which occupies a portion of the light beam path.

The multioscillator ring laser gyroscope produces two signals which are optically biased (due to the Faraday cell). One signal frequency is the Faraday frequency plus one half the rate frequency; the other is the Faraday frequency minus one half the rate frequency. The gyroscope outputs the phase (integrated frequency) of these two signals. Their difference represents a rotation angle increment. However, the output signals are quantized at discrete levels separated by two π of the gyroscope phase (i.e., an interference fringe).

The two output signals from the multioscillator are produced by heterodyning the like-polarized counterpropagating optical signal beams. Such signals are called heterodyne signals. One or more heterodyne signal is created for the left hand circularly polarized gyroscope and one or more is created for the right hand circularly polarized gyroscope. This can be accomplished either with an optical polarizer or other signal processing scheme. The heterodyne signals represent intensity fringes.

Optical signal fringes are produced by the heterodyne signals and detected by a pair of photo sensors. The fringes are counted and the digital counts are measures of angle increments sensed by the multioscillator ring laser sensor.

The increments of the digital angular measure of the fringes are determined by the scale factor of the ring laser sensor, and they are typically on the order of one to two arc-seconds per pulse.

The difference between the true angle and that indicated by the pulses is an error, called the quantization error or quantization noise. The ring laser sensor itself, however, is capable of measuring extremely accurate angles, and is limited by its pickoff and by the electronics processing the pickoff signal.

Usually, a resolution of one to two arc-seconds is adequate for navigation purposes; however, many new applications in the areas of pointing and tracking require even better angular resolution. These applications of the multioscillator ring laser gyroscope require very high resolution outputs, down to 0.01 or even 0.001 arc-second. There are many such applications where it is desirable to point and track with an enhanced angular resolution, such as the positioning of a terrestrial or celestial based observatory and telescope. Several techniques for refining the resolution exist, particularly by state-of-the-art digital techniques. Such techniques depend upon sampled data systems and are susceptible to aliasing errors. (The term "aliasing" is used to signify the existence of periodic function signal overlap. Aliasing is a property related to the digital sampling of continuous or discrete periodic signals. One of the main consequences of aliasing is the inability to distinguish between two periodic signals whose frequencies differ in integral multiples of the sampling rate. In this manner, when aliasing is present, the sampled data has accumulated false or exaggerated information. For digital filtering to work, aliasing must be reduced substantially or eliminated.)

Previously, attempts have been made to enhance the resolution of Ring Laser Gyroscopes (such as planar two-mode dithered model gyroscopes). In U.S. Pat. No. 4,533,250 (issued Aug. 6, 1985 to inventors, Callaghan et. al.) a READOUT APPARATUS FOR A RING ANGULAR RATE SENSOR is disclosed. The patent discloses a technique which measures the time between pulses and interpolates to determine the angle at specific times. This approach may cause problems due to excessive noise. U.S. Pat. No. 4,791,460 (issued Dec. 13, 1988 to inventors, Bergstrom, et. al. and entitled READOUT FOR A RING ANGULAR RATE SENSOR) discloses a scheme which uses a weighted sum of the analog heterodyne waveforms to generate other phase shifted waveforms thereby providing more zero crossing per cycle and hence better resolution. This approach may also encounter noise problems and is dependent of relatively precise weighing of coefficients.

Other techniques have been proposed in the past for improving the output resolution of encoders and gyroscopes. Theses include interpolation using an A/D converter to read the analog heterodyne voltages, or multipliers to create harmonics of the heterodyne signals. These techniques, however, do not have good noise immunity and are sensitive to gain, phase, and offset changes in the detectors and circuitry.

For applications where extremely fine angle resolution is required, several methods of circumventing the ring laser gyroscope readout problem were explored.

What is needed is an enhanced resolution ring laser gyroscope system so that measurements may be made down into the fractions of an arc-second with relative precision and accuracy.

SUMMARY OF THE INVENTION

Disclosed herein is an improved system of digital resolution enhancement which reduces the sensitivity to frequency relationships and avoids aliasing. The resolution enhancement system of this invention relies on digital processing of sampled data. This invention teaches the use of a fast filter which averages over many samples and can therefore be used to improve the output resolution. Such filters have been implemented in software to permit rapid estimation of gyroscope random walk. The fast filtering mechanization gives rise to the problem of aliasing. To avoid such aliasing, one may choose the sampling frequency in a specific relation to the gyroscope's Faraday frequency. However, this imposes relatively strict constraints as to the variation of the Faraday frequency. A better solution for the problem of aliasing, in the presence of noise or rate, may be to randomize the quantization error. The invention herein carries the filtering process one step further. A hardware/software mechanization permits fast (in excess of two MHz) sampling and filtering of gyroscope data thereby providing very effective resolution enhancement without causing substantial time delays. The fast filtering technique averages over many samples and therefore has good noise immunity. Gain, phase, and offset do not cause significant errors since the mechanization is inherently digital. The Faraday bias generates a periodic quantization error. Because of the nature of the quantization error (i.e., a Sawtooth) all harmonics of the bias frequency are present. The amplitude of these can be shown to fall off only as 1/N. Thus, care must be taken in selecting the fast sampling frequency to ensure that none of the strong harmonics will alias into low frequency bands where the fast filter does not provide any attenuation.

The resolution enhancement approach focuses on the development of a general applicability resolution enhancement technique which will operate with any Faraday bias frequency. In support of this goal, a sampling frequency chirp technique has been developed which substantially eliminates aliasing effects. The chirp is based on a phase locked loop which maintains long term frequency stability while permitting short term frequency modulation. The chirped sampling clock can, therefore, be used in cases where variation (or changes) in Faraday frequency are expected and/or cases in which proper frequency selection is not possible.

To enhance the resolution and to avoid aliasing, the apparatus of this invention uses a fast filter and a chirped sampling frequency for the digital sampling.

It is therefore a feature of the invention to enhance the resolution of the output signal from a ring laser angular rate sensor.

More particularly, it is a feature of the invention to enhance the resolution of the output signal from a multioscillator ring laser gyroscope.

It is also a feature of this invention to avoid aliasing in the sampled data system which produces an output signal from such angular rate sensors.

Other goals of the invention will become apparent from the following description, taken together with the accompanying drawings.

DETAILED DESCRIPTION OF THE PREFERRED EMBODIMENT

Figure 1A:
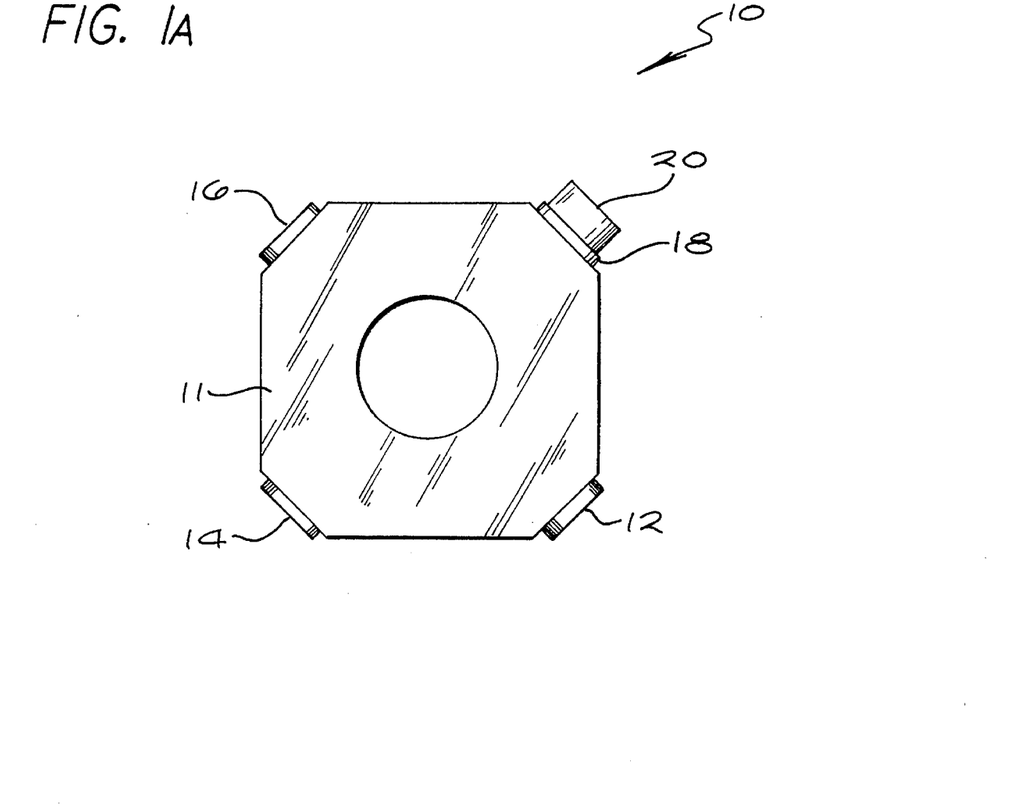
FIG. 1A is a plan view of a ring laser gyroscope which may be used as a multioscillator.
Figure 1B:
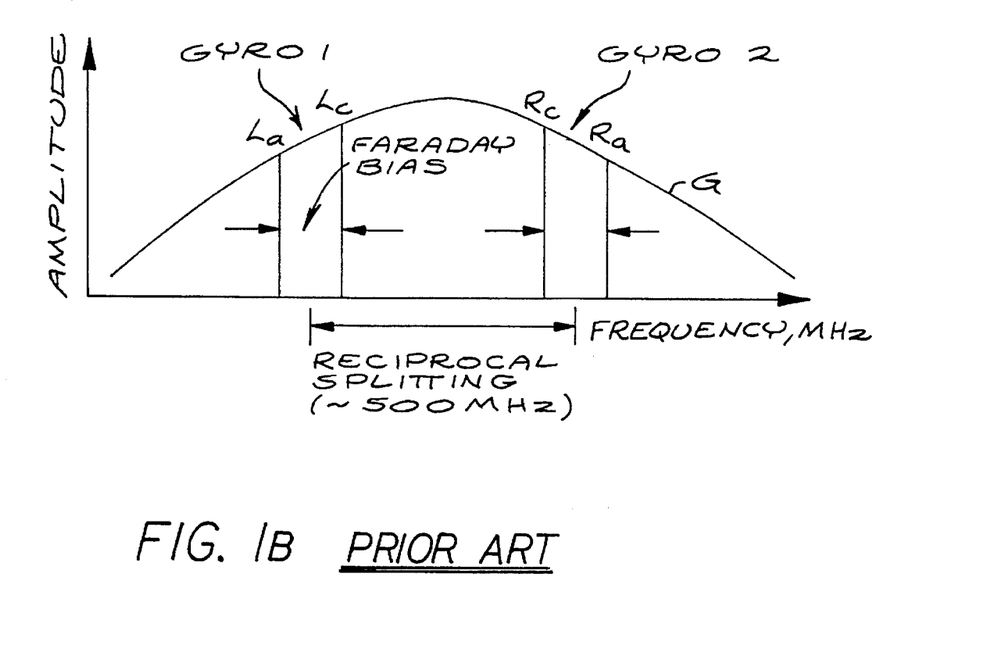
FIG. 1B is a PRIOR ART graphic representation of the Gain Profile curve for a non-planar multioscillator ring laser gyroscope, showing both reciprocal and Faraday splitting of the multimode resonant frequencies of the ring laser gyroscope.

A top view of the multioscillator gyroscope instrument 10 is shown in FIG. 1A. A laser block 11, such as a quartz block, having extremely good dimensional stability is used. A conduit within the block extends in a closed optical path (not shown) between the mirrors 12, 14, 16, and 18. The counterpropagating optical beams within the ring laser are extracted through a partly transmissive mirror 18 into the heterodyne sensors 20 which produce the optical signal which is processed by this invention.

The ring laser gyroscope is a rate integrating instrument which outputs incremental angles ($\Delta\theta$'S). The ring laser gyroscope outputs digital counts that are representative of angle increments. The detection scheme counts the number of interference pattern fringes passing across a photo detector. Thus, the output of the gyroscope, a digital count, is quantized. At first impression, this quantization of data appears to limit the output angle resolution of the ring laser gyroscope. These increments are determined by the scale factor of the gyroscope and are typically on the order of 1 to 2 arc-seconds per pulse (1.5 arc seconds for an 18 cm multioscillator ring laser gyroscope). However, this finite resolution leads to gyroscope angle quantization noise. Moreover, optically, the multioscillator ring laser gyroscope is a rate integrating instrument, and as such, tracks angle changes to essentially infinite resolution. The quantization present is therefore only a limitation of the readout scheme.

Figures 2A, 2B:
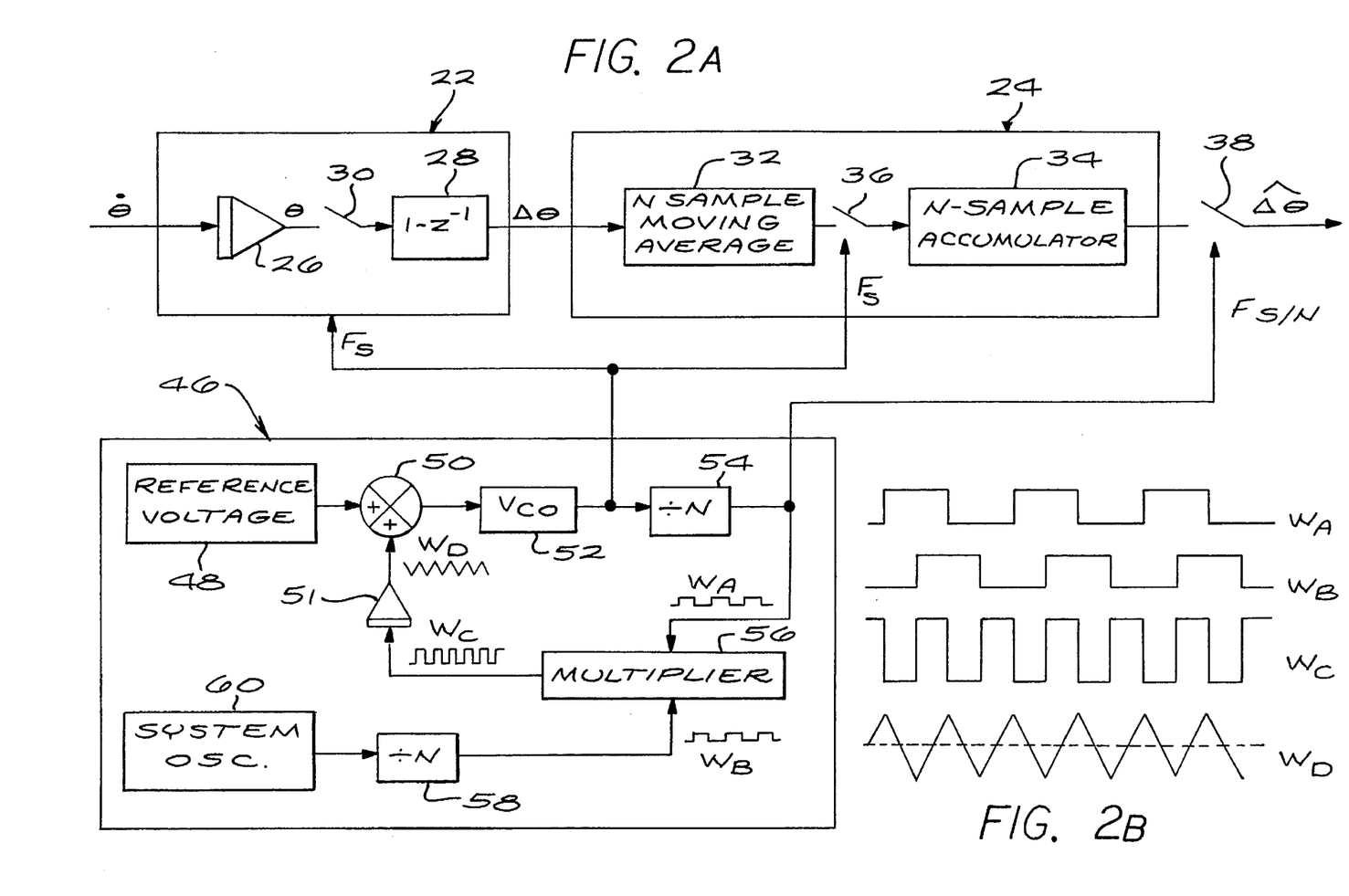
FIG. 2A is a system block diagram of a preferred embodiment of the multioscillator sensor electronics, a fast filter, and a chirp controller.
FIG. 2B shows is a digital timing diagram showing the waveforms of the output of identified signals in FIG. 2A.

The multioscillator ring laser gyroscope accumulates total rotation angle. However, since, as stated hereinbefore, the readout scheme in an ring laser gyroscope generally consists of digitizing the heterodyne detector outputs and counting transitions over a fixed time interval in order to provide an incremental angle, this digitizing process leads to a quantization step which depends on the gyroscope scale factor. As a result of this quantization, the absolute angle resolution is limited. It should be pointed out, however, that absolute angle is always correct to within $\pm 0.5$ quanta since the gyroscope internally maintains the correct rotation angle. A valid model of the gyroscope readout process is shown in FIG. 2A. Angular rate is input to the gyroscope, which is a rate integrator 26. The output measured angle $\theta$ is then sampled (at sampler and quantizer 30), at a predetermined rate $F_s$, and the electro-optically quantized measurement signal is then processed, in accordance with the delay transform function shown at 28 ($1-z^{-1}$), such that the output of the gyroscope and heterodyne detection system 22 is $\Delta\theta$.

In a multioscillator ring laser gyroscope, a large Faraday bias is present in both gyroscopes. When the rates are subtracted, the bias cancels in common mode leaving only the true rotation rate. Nonetheless, the Faraday bias can be used to advantage as long as the outputs of both gyroscopes are quantized prior to recombination. The presence of the bias ensures that a large number of digital transitions will take place in the course of a sampling period, thereby allowing the fast filter averaging to take place. If the quantizers on both gyroscopes (all multioscillators have two separate gyroscopes that physically use the same optical pathway) are assumed uncorrelated (this can be ensured by injecting noise in the comparators), then the resolution enhancement can be achieved even upon recombination.

After an incremental angle $\Delta\theta$ is developed at the output of the gyroscope system 22, this signal is then provided to the fast filter 24. The fast filter 24 consists of a high speed N-sample moving average filter 32 followed by an N-sample accumulator 34 as shown in FIG. 2A. After filtering by the moving average filter 32, the output data from the filter 32 is sampled by the data sampler 36 (at a sampling rate $F_s$) for use by the high speed accumulator 34. If the length of the moving average is equal to the length of the accumulation, then an efficient implementation which requires essentially no data storage is available as indicated in the hardware preferred embodiment FIG. 3, which will be described in detail hereinafter. The output of the fast filter 24 is an enhanced resolution incremental angle $\Delta\hat{\theta}$, which is obtained after the output signal from the N-sample Accumulator 34 is sampled by the sampler 38 at a sampling rate of $F_s/N$. Since the fast filter 24 is linear, a further simplification is possible. The two gyroscope outputs are quantized separately, subtracted, then filtered. In this case, only a single filter is required but the same resolution enhancement is obtained. It is extremely important, nonetheless, that the quantization process be introduced prior to recombination. If the two gyroscope outputs are combined optically, then quantized, the fast filtering technique will become ineffective unless high rates are constantly present on the gyroscope. For this reason it is desirable that an electronic technique for detection of the polarized output signals of the multioscillator ring laser gyroscope be used.

There is some cross-coupling between the two gyroscope outputs due to inability to completely reject the unwanted polarization, and from electronic coupling (grounds, capacitance, etc.). In certain gyroscopes this can be anywhere from 1 to 20%. When the gyroscope output is squared-off and counted, this leads to the equivalent of sum and difference frequencies. The difference frequency can be a low frequency and can not be filtered. Thus a good separation between polarizations is essential for high resolution and low noise.

If the quantization boundaries are being crossed at a sufficiently high rate (due to factors such as noise, motion, or Faraday bias) then it is possible to fast filter the data. This provides an averaging over many boundary crossings and provides improved resolution. The filtered output is reconstituted as described in FIGS. 2C or 3.

In order to ensure that proper enhanced resolution data is received by the system processor or computer, it is mandatory that the chirped sampling clock, like frequency modulator 46, be locked in the long term to the system oscillator 60. If this is not the case, then unacceptable jitter and drift could occur in the gyroscope data. This is accomplished, as shown in FIG. 2A, by the phase-locked loop (PLL) sampling frequency modulator 46.

Figure 7:
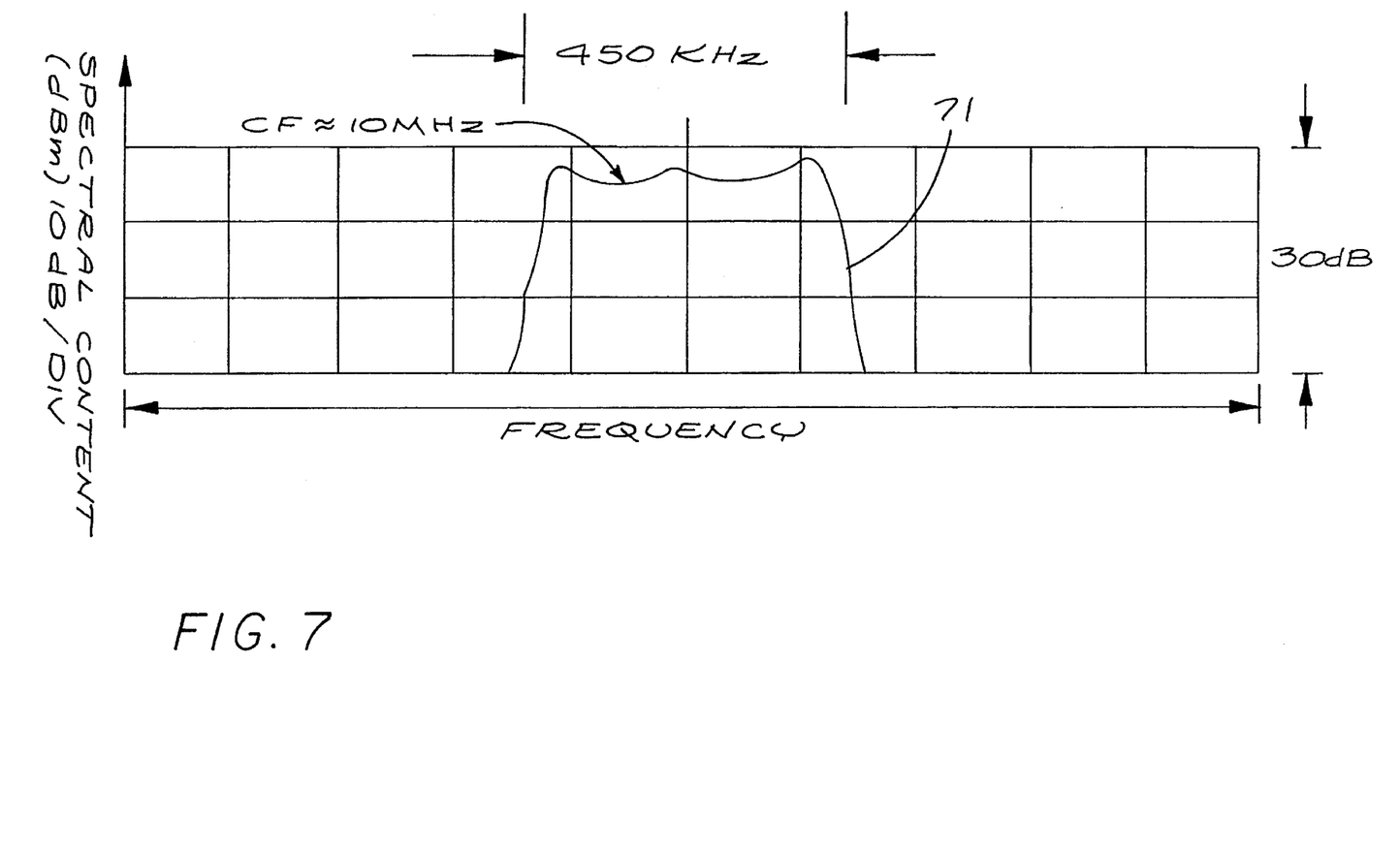
FIG. 7 is an example of data gathered and plotted on a "Spectral Content vs. Frequency" graph to illustrate the effect of the operation of the frequency modulator 46 of FIG. 2A.

The PLL naturally produces the desired sampling clock chirp sampling signal at the output of the voltage controlled oscillator 52 ($F_s$) and the divide-by-N counter 54 ($F_s/N$) as illustrated in FIG. 2A. The amplitude of the chirp is simply set by the time constant of the PLL integrator 51. In designing and constructing the circuit to perform the necessary functions of the modulator 46, a spectrum analyzer may be used to measure the frequency spread of the PLL's voltage controlled oscillator (VCO) 52. The spectrum 71 is shown in FIG. 7. The spectrum 71 indicates that the frequency is modulated relatively uniformly over a broad range about the center frequency (CF) as desired. The VCO 52 can therefore be used as the source for the sampling clock 46. With reference to the signal timing diagram of FIG. 2B, as well as FIG. 2A, the clock signal of the modulator clock 46 is developed after the PLL is locked to the system oscillator 60 (where the system high frequency rate $F_s$ is processed through divide-by-N counter 58, to produce the signal $W_B = F_s/N$) and that oscillator's divided clock signal $W_B$ is multiplied (at the multiplier/correlator 56) by the output signal $W_A$, of the divide-by-N counter 54. (Referring to FIG. 2B, it will be noted that signals $W_A$ and $W_B$ are in phase quadrature with one another.) The product, waveform $W_C$, of the waveforms $W_A$ and $W_B$, is then provided to the input of integrator 51. The output waveform, $W_D$, of the integrator 51 is a triangular shaped wave, as shown in FIG. 2B. This signal, waveform $W_D$, is then summed, at the summing node 50, with the reference voltage source 48, which source voltage is tuned to match the frequency of the system oscillator 60. In this manner, the sampling frequency modulator produces a desirable sampling rate standard that helps avoid aliasing.

Figure 6A:
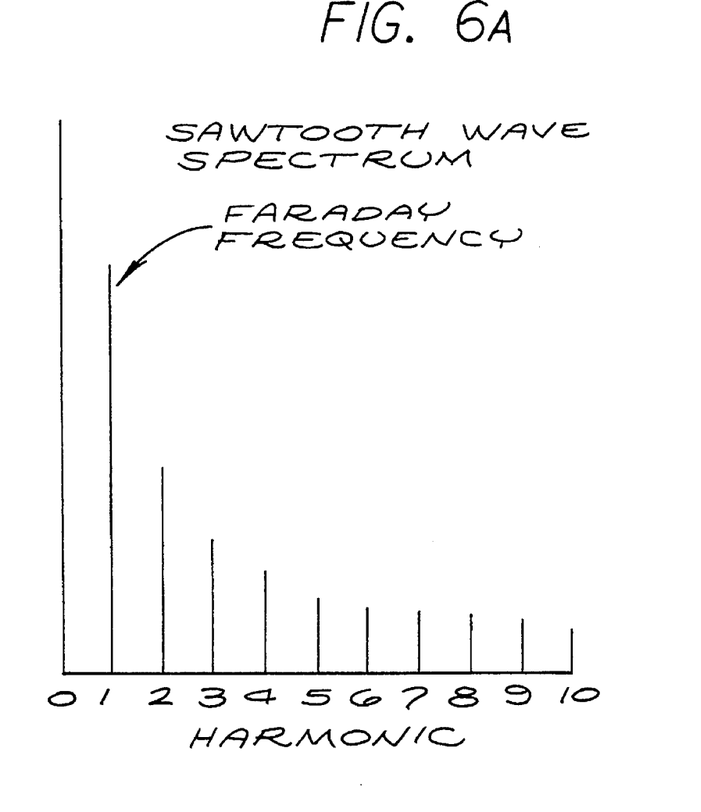
FIG. 6A shows the frequency spectrum of the quantization error of FIG. 4B.
Figure 6B:
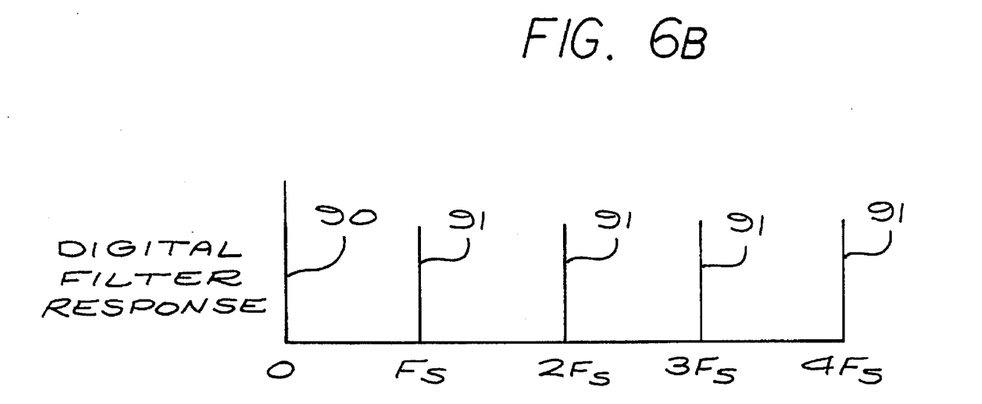
FIG. 6B shows the Fast Filter pass band and its images due to aliasing.

The passband of the fast filter 24 is reproduced exactly at every multiple of the sampling frequency $F_s$ as illustrated in FIG. 6B. The harmonics (1–10, for example) of FIG. 6A are a result of quantization of the Faraday bias of the multioscillator ring laser gyroscope. Aliasing of quantization noise can therefore occur if a harmonic of the Faraday frequency falls within one of the passbands 91 ($F_s$, $2F_s$, $3F_s$, or $4F_s$) (See, FIG. 6B). Only the data within the fast filter passband 90 is desirable.

It is possible to get around this by selecting the sampling frequency in such a way that none of the low order harmonics alias to low frequencies. By the time higher order harmonics are involved (i.e., 11th and above), the power is sufficiently low that aliasing is not as serious a problem.

This selected sampling frequency approach poses problems in that resolution enhancement will be degraded if different Faraday bias gyroscopes are employed or if the Faraday frequency drifts (e.g. with temperature).

To demonstrate the effects of aliasing, simulations were run in which aliasing conditions were included. It was observed that aliasing increased the RMS (Root Mean Square) noise level and resulted in very large periodic signals in the data. The aliasing phenomenon discussed above can lead to degraded performance in terms of angle noise. The chirping frequency modulator 46 of FIG. 2A helps to avoid the problems associated with aliasing. The use of the modulator 46 renders the resolution enhancement technique insensitive to the value of the Faraday frequency. By continuously "chirping" (i.e., varying) the sampling frequency over a predetermined range, aliasing of discrete harmonics is effectively prevented. By using a sampling frequency which varied ±2% in a triangular fashion about a mean value (such as waveform $W_D$), simulation studies indicated that aliasing effects have been substantially reduced or virtually eliminated. Using the frequency modulation technique of FIG. 2A, it was seen that the RMS (root mean square) error has been reduced and that any large discrete frequencies normally observed in the presence of aliasing were eliminated.

Figure 8A:
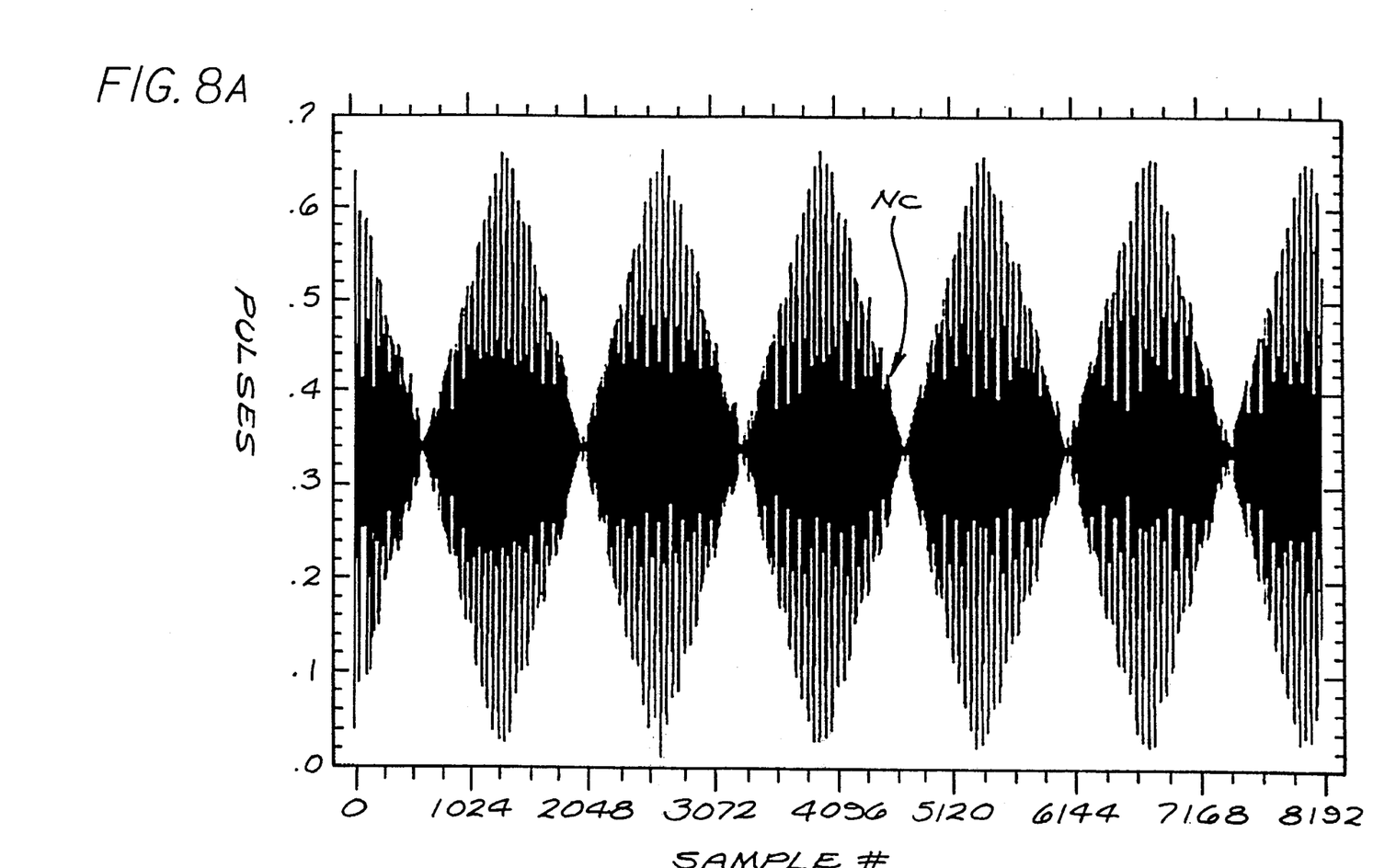
FIG. 8A is a graphic representation (plotted as pulses against samples) of enhanced gyroscope output data with aliasing prior to sampling frequency chrip.
Figure 8B:
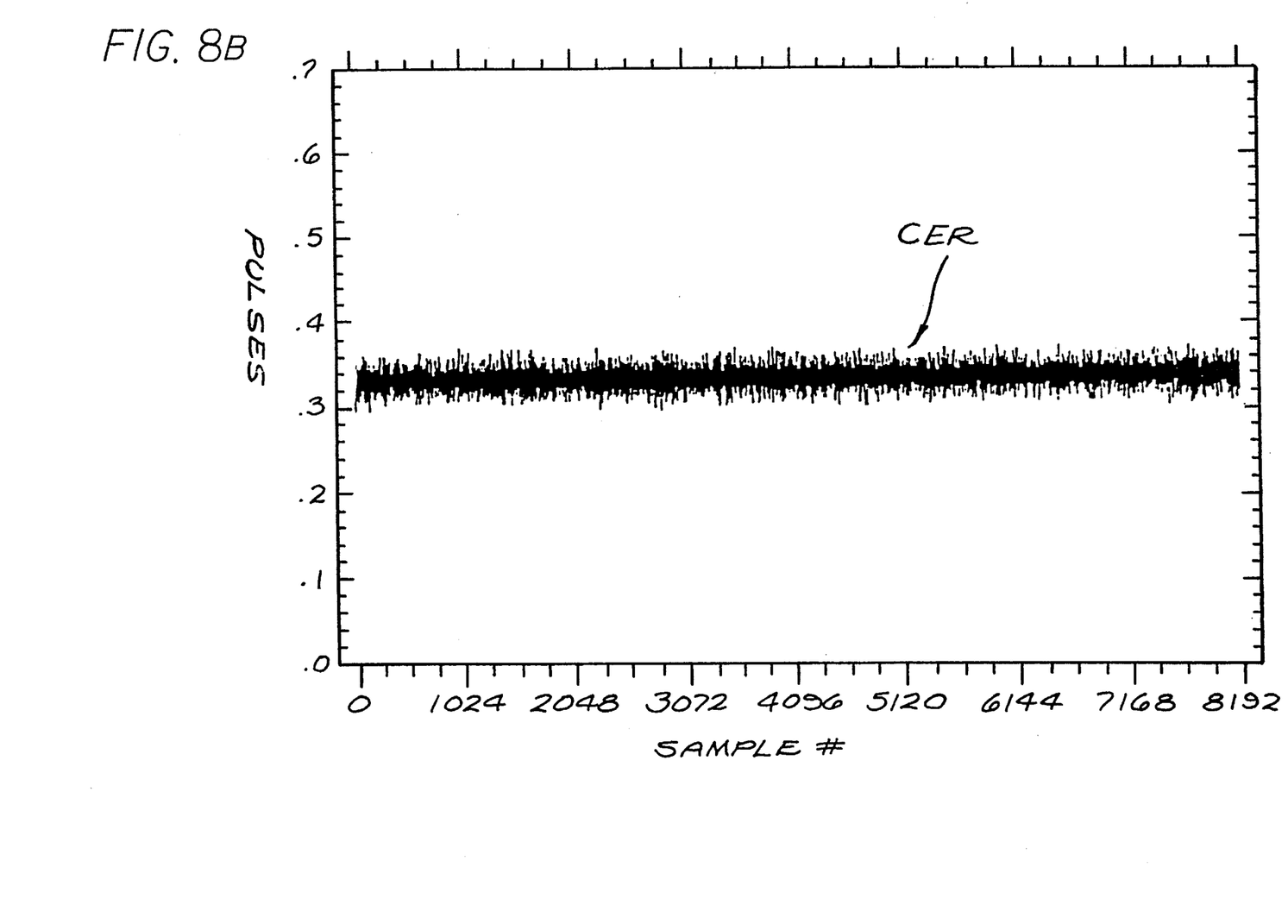
FIG. 8B is a graphic representation (plotted as pulses against samples) showing resolution enhanced gyroscope output data as in FIG. 8A but with sampling frequency chirp.

In order to evaluate the effectiveness of the clock chirp circuitry 46 of FIG. 2A, the inventors tested their design. Two precision frequency synthesizers were used to emulate the gyroscope outputs (i.e., Faraday frequency plus half rate frequency and Faraday frequency minus half rate frequency). This enabled the inventors to tune the Faraday frequency to bands in which quantization aliasing would come into play. After performing many such tests with a fixed sampling clock and then repeating these tests with the chirped sampling clock, the results achieved are illustrated in FIGS. 8A and 8B. FIG. 8A shows the resolution enhanced signal NC prior to sampling clock chirp as being unintelligible, while FIG. 8B shows the same parameters run with the chirped or frequency modulated clock 46 (producing signal CER). As can be seen, the modulator 46 vastly improves the data noise characteristics. The RMS is reduced by an order of magnitude and the very strong periodic signal resulting from aliasing is eliminated. FIGS. 8A and 8B show the periodic harmonic signals with (CER) and without (NC) the use of the chirper modulator 46.

Figure 2C:
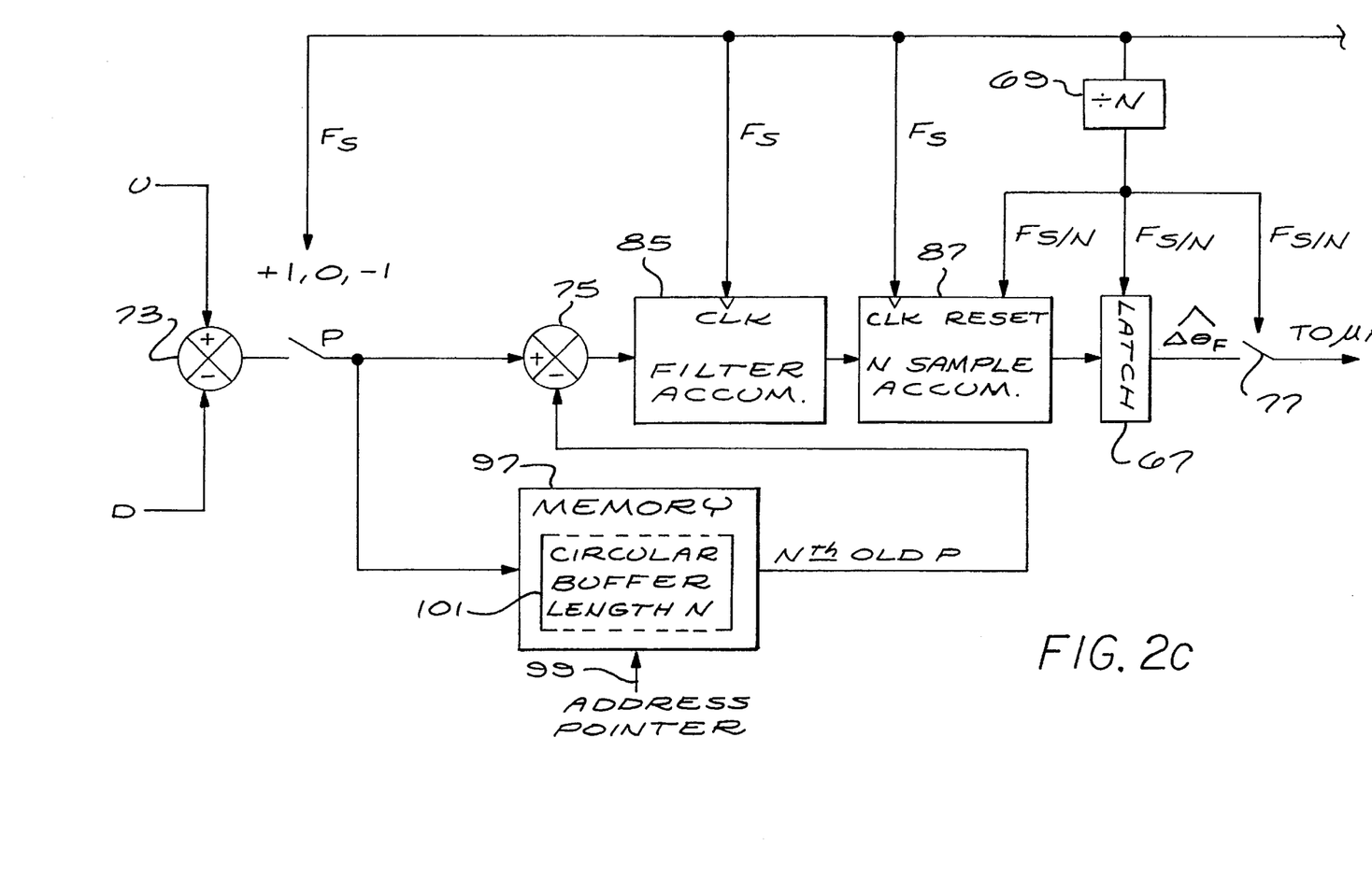
FIG. 2C is a schematic diagram showing an alternative embodiment of the invention illustrating the hardware which implements the system of FIG. 2A.
Figure 3:
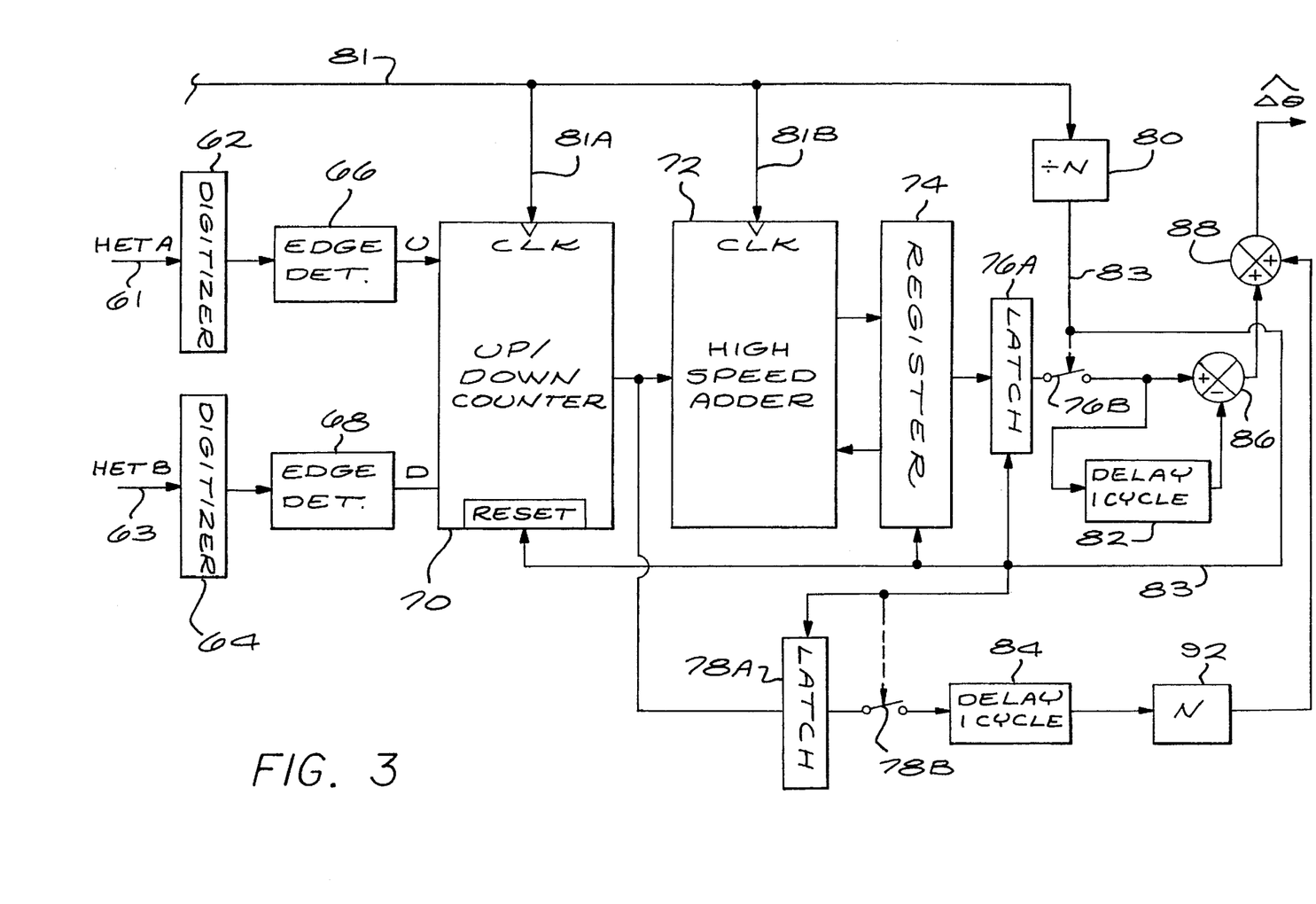
FIG. 3 is a schematic diagram showing the hardware which implements the system of FIG. 2A in the preferred embodiment of the invention.

With reference to FIGS. 2C, 3, the fast filter 24 can be implemented purely with digital hardware that is relatively insensitive to characteristics of the gyroscope output signals (i.e., amplitude and offsets); and, it actually works better in the presence of a small amount of noise. A fast filter (like 24 of FIG. 2A) is used to sample data. The operation of a moving average filter (or specialized Finite Impulse Response Filter (FIR)) has been heretofore described (at a different rate and for a different purpose from the subject invention of this application) in U.S. Pat. No. 4,634,283, entitled METHOD AND APPARATUS FOR REDUCING QUANTIZATION ERROR IN LASER GYRO TEST DATA THROUGH HIGH SPEED FILTERING, and issued Jan. 6, 1987 to the same assignee as the assignee of this application. If executed fast enough (i.e., in hardware), the filter provides minimal time delay and wide bandwidth. In the alternate embodiment of FIG. 2C, the fast filter consists of a filter accumulator 85 and an N-sample accumulator 87. The high speed clocking signal $F_s$, provided by the modulator circuit 46 of FIG. 2A, drives the hardware components 85 and 87. A divide-by-N counter 69 is used to provide a lower frequency sampling signal ($F_s/N$) (as in FIG. 2A) to the N-sample accumulator 87, the Latch 67, and the sampler 77 for the final enhanced resolution angle measurement. This alternative embodiment hardware provide up (U) and down (D) counts from the gyroscope heterodyne detectors to a summing node 73, providing a stream of pulses (P) in the forms +1, 0, or −1 to at the sampling rate $F_s$. The pulses (P) are directed to the Filter Accumulator 85 and to the memory 97, where the current value of the sampled pulse (P) is loaded into the N-length circular buffer 101, at a location specified by the address pointer 99. The Nth old value of P is then subtracted (at the summing node 75) from the current value P and provided to the filter accumulator 85. As one can see, this alternative embodiment requires a large amount of data storage in the memory 97 and its buffer 101. The output signal generated by the accumulator 85 is a moving average filter and as the signal is processed through the N-sample accumulator 87, the output at sampler 77 results in an enhanced resolution signal, as one illustrated in FIG. 8B. While this mechanization normally requires a large amount of data storage, a technique which eliminates the need for this storage has been developed. This technique is illustrated in FIG. 3. The fast filter can be implemented simply with a high speed counter 70 (which already exists in all ring laser gyroscope systems) and a high speed adder 72 with a register 74. The counter 70 accumulates the gyroscope pulses (U and D), which are provided to the counter 70 by the edge detectors 66 and 68. The edge detectors 66 and 68 provide a pulse every time the state of the associated digitizer changes. This, in effect, is the quantization process. (The heterodyne detectors, A and B, are sensitive to the left and right circularly polarized gyroscopes, respectively. They provide het signals 61 and 63 to the digitizers 62 and 64. The digitizers 62 and 64 then supply the edge detectors with the digital state of the heterodyne signals. It is advisable to inject a small amount of noise into the digitizers in order to break up repetitive patterns and to avoid correlation between the two digitizers.) Normally, the inherent electronic noise is sufficient so that deliberate injection is not required. The contents of the counter 70 are then added, by the adder 72, to the register 74. At lower speeds ($F_s/N$), the contents of the counter 70 and register 74 are latched (to latches 76A and 78A) and cleared. The latched values are provided from the latches 76A and 78A. At the same time, the system computer is instructed to read the latched values 76A and 78A via the samplers 76B and 78B and to combine them to form a filtered output past the summer 88. The hardware portion of the fast filter can be implemented entirely in a gate array. The software portion requires only minimal duty cycle. The equations corresponding to the fast filter are as follows:

```
LOOP
  Hardware: For   I = 1 to N
                  S = S + Input              (Block 70)
                  A = A + S                  (Block 72)
                  Next I
                        S₁ = S               (Block 78)
                        A₁ = A               (Block 76)
                        S = 0
                        A = 0
  Software:
    Output = (A₁ − A₁ Old) + N*S₁ Old  (Blocks 86, 92, 88)
       A₁ Old = A₁     (Block 82)
       S₁ Old = S₁     (Block 84)
    END LOOP
```

In the preferred embodiment of FIG. 3, the quantization noise power is reduced by a factor of up to N in the above case leading to an effective resolution improvement of up to the square root of N. The Divide-by-N counter 80 provides a slower frequency sampling rate ($F_s/N$) to the hardware system shown in FIG. 3. The microprocessor is provided by the fast filter (counter 70, adder 72, register 74, and latches 76A and 78A), the necessary sampled count (S) and the Accumulated count (A) such that the microprocessor may derive an enhanced incremental output angle $\Delta^\wedge\theta$ at the output of summer 88. The Accumulated count A is delayed one cycle 82, and the delayed A signal and the new A signal are combined (at summing node 86) to form a delta A signal which is provided to summing node 88. This accumulated A (delta) signal is combined at node 88 with the sampled count S, delayed one cycle (by delay Z-transform 84) and multiplied by the gain N (92). In order for the fast filter to be effective, it is necessary that a large number of quantization boundary crossings be generated over the averaging time. In a dithered ring laser gyroscope, these are provided by the dither motion. In a multioscillator ring laser gyroscope, the boundary crossings can be generated by the Faraday bias. However, because the Faraday bias is relatively constant, periodic quantization error patterns can be present leading to aliasing. This implies that low frequency quantization errors (which can't be filtered) might be generated. In order to circumvent this, one of two approaches can be used. The preferred approach involves very fast counters and adders (10 Mhz or higher). The fast sampling ensures that only high order harmonics present in the quantization error will alias. The strength of the harmonics falls off at high orders so that the errors due to their aliasing are not significant. The addition of the Sampling Frequency Modulation generated by circuit 46 reduces aliasing so that frequencies lower than 10 MHz are acceptable.

A second approach involves the use of a rate multiplier to digitally select the sampling and adder frequency in such a way as to avoid aliasing of low order harmonics. Since the rate multiplier itself has repetitive patterns, it is also necessary to jitter the sampling clock in a random or pseudo-random fashion. Because very high speed logic is now available at reasonable costs, it is felt the first approach is preferable because of its simplicity. While the resolution enhancement technique was described above for ring laser gyroscopes and multioscillator ring laser gyroscopes, it may also be applied to encoders and other devices which have quantized outputs with a large number of boundary crossings occurring over the averaging time.

Figure 4A:
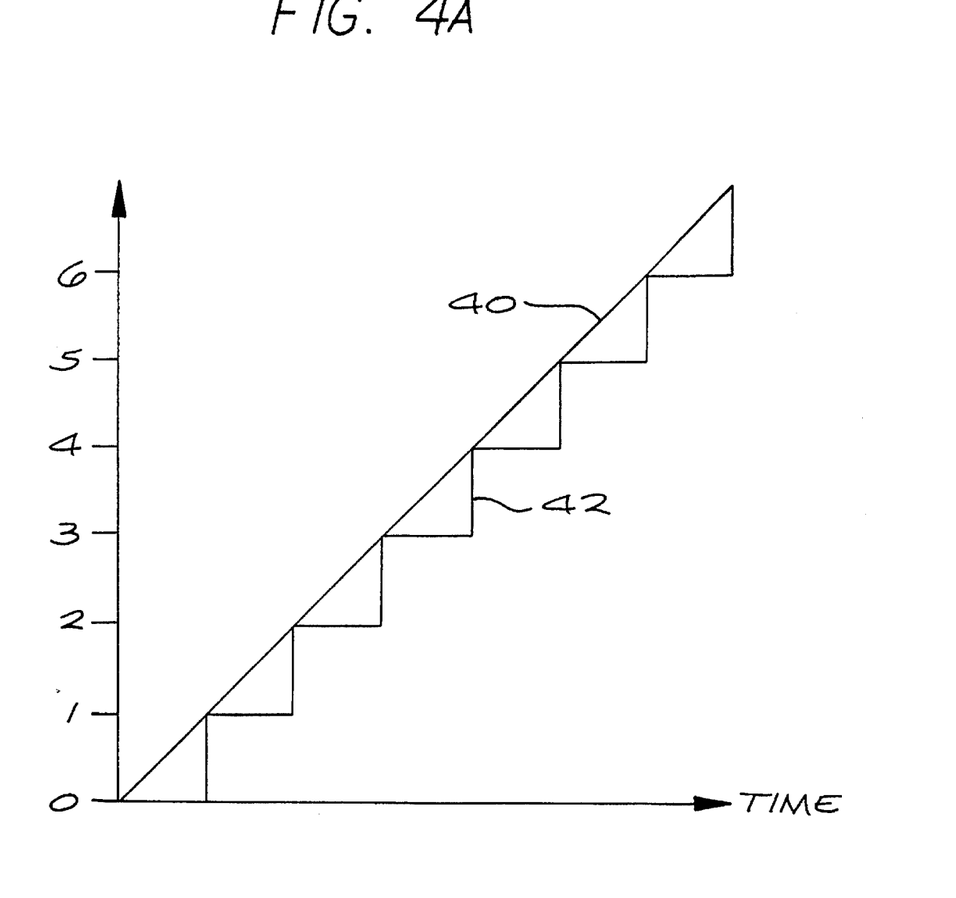
FIG. 4A is a graph showing the accumulation of quantization measurement contrasted with the true angle of rotation of the ring laser gyroscope of this invention.

FIG. 4A illustrates the behavior of one of the two gyroscope outputs. The purpose of resolution enhancement is to permit observation of angles in between the quantization boundaries.

In the time domain, the fast filter makes use of the fact that the Faraday bias is generating a large number of counts in the course of a typical computer sampling interval (e.g. 500 msec). Averaging over many such counts permits fractional count resolution.

Figure 4B:
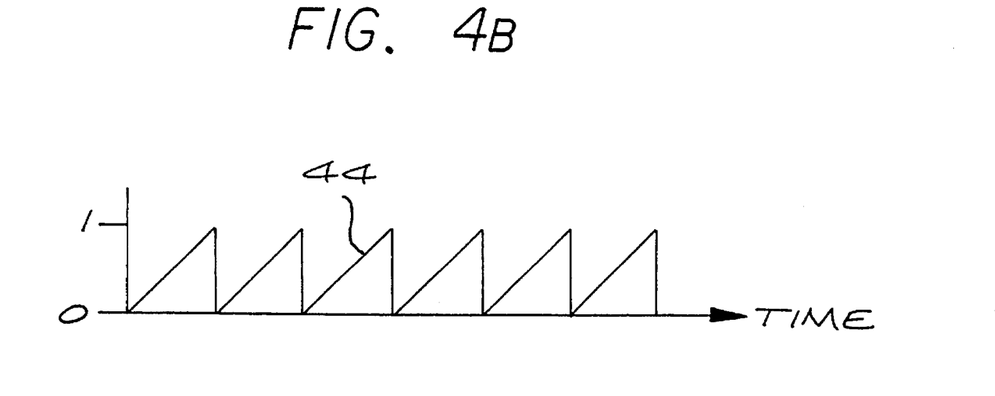
FIG. 4B is a graph showing the error due to quantization for the ring laser gyroscope of this invention.
Figure 5:
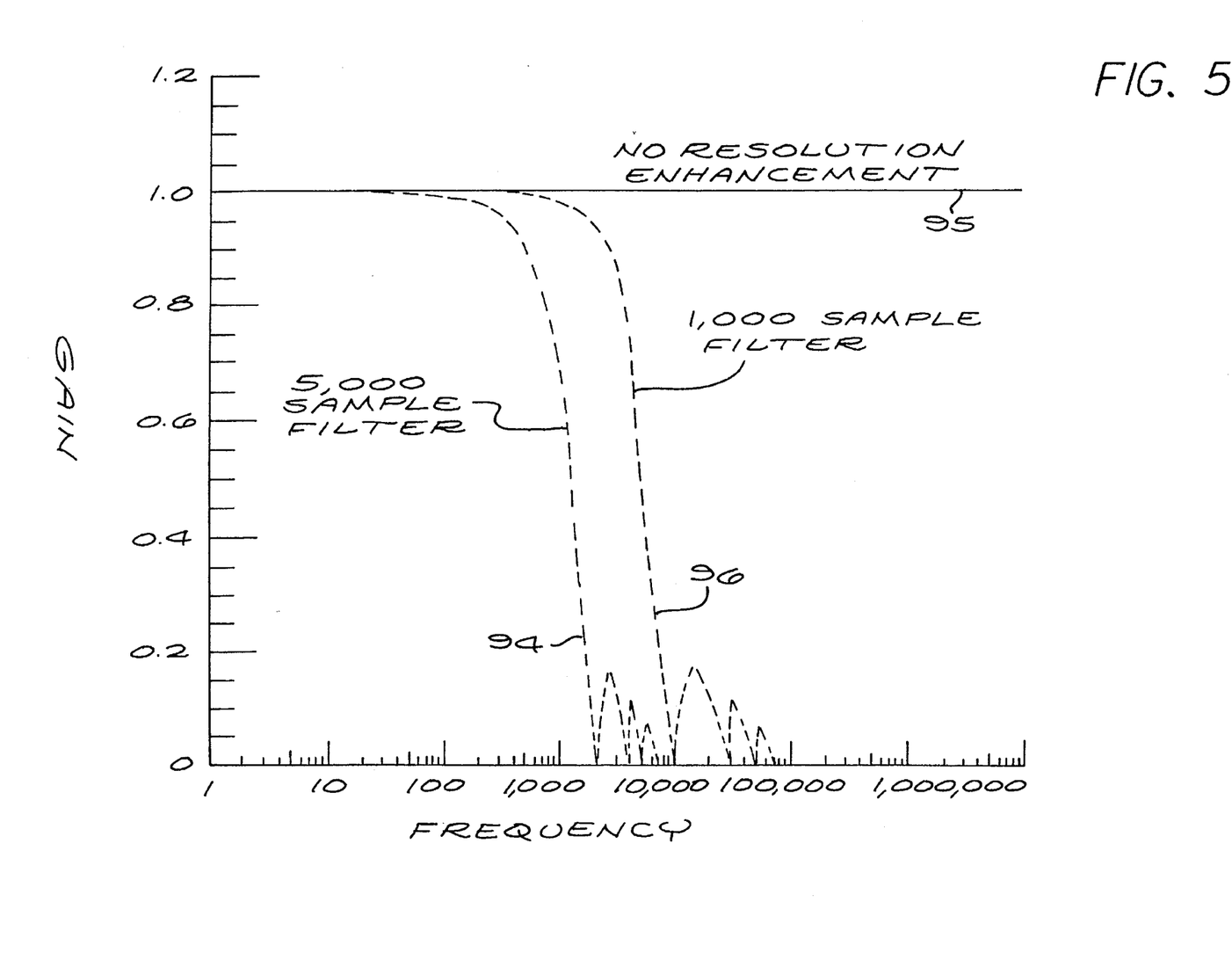
FIG. 5 is a graph demonstrating the frequency response of the resolution enhancement filter by using selected sample Fast Filters.

The fast filter can also be analyzed in the frequency domain. The quantization error waveform shown in FIG. 4B can be decomposed into its Fourier components. (In the time domain, FIG. 4A illustrates the true value 40 of the rotational angle of the gyroscope verses the quantized measured gyroscope output 42. FIG. 4B shows the magnitude of the quantization error 44 over time.) The Faraday frequency and all its harmonics appear with amplitudes which decrease with order as shown in FIG. 6A. However, since the Faraday frequency is typically very high (on the order of 1 Mhz to several Mhz), and the required data bandwidth relatively low (on the order of 1 Khz), it is possible to implement a very effective quantization filter as illustrated in FIGS. 6A and 6B. The digital moving average filter discussed previously can accomplish this function. This filter is of the FIR (Finite Impulse Response) variety which has the desirable property that what goes in will (eventually) come out. If executed at a high rate, it can provide substantial attenuation at high frequencies while preserving a wide pass band at useful frequencies. A typical frequency response curve is given in FIG. 5. It will be noted that FIG. 5 shows that the frequency response for 5000 samples (94, output frequency 2000 Hz) is narrower than the response for 1000 samples (96, output frequency 10000 Hz).

The spectra of resolution enhanced data processed with a chirped sampling clock exhibit the standard quantization noise profiles.

Several options for ring laser gyroscope resolution enhancement have been discussed. The simplest and most reliable for multioscillator ring laser gyroscopes is the fast filter.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, any frequency modulator exhibiting random output characteristics like the modulator 46 of FIG. 2A would be useful to act as the source of the signal needed to counter the effects of aliasing of the digitally filtered data. Also, although the operation of this invention has been discussed primarily in the context of a multioscillator ring laser gyroscope, two mode planar dithered ring laser gyroscopes, as well as all other forms of ring laser angular rate sensors, are intended to be comprehended within the scope of these claims. Thus, alternate embodiments having substantially equivalent functions or structures are intended to be comprehended within the scope of the appended claims.

What is claimed is:

1. In a ring laser gyroscope and inertial guidance system, a system for enhancing the resolution of detected angular rate information:
   means for detecting angular increments, representative of optically integrated angular rate, in the form of digital counts, said detecting means positioned at an output optics location of said ring laser gyroscope;
   digital filter means for sampling and accumulating angular incremental information as accumulated digital counts;
   frequency modulated sampling means for sampling the accumulated digital counts at a pre-determined rate, such that the effects of aliasing of said accumulated digital counts in said digital filter means is minimized;
   whereby, an enhanced resolution of angular and angular rate information is achieved.

2. The system for enhancing the resolution of detected angular rate information of the ring laser gyroscope of claim 1, wherein:
   said digital filter means for sampling and accumulating angular incremental information further comprises:
   a resettable digital averaging filter; and,
   an n-sample accumulator.

3. The system for enhancing the resolution of detected angular rate information of the ring laser gyroscope of claim 2, wherein:
   said resettable digital averaging filter is an n-sample moving average filter.

4. The system for enhancing the resolution of detected angular rate information of the ring laser gyroscope of claim 1, wherein:
   said frequency modulated sampling means for sampling the accumulated digital counts at a pre-determined rate further includes:
   a system oscillator and a reference voltage generator;
   a voltage controlled oscillator controlled by said voltage generator and said system oscillator;
   said voltage controlled oscillator producing a signal that may be used to establish the predetermined sampling rate, whereby the system may counter the effects of aliasing which occurs during digital filtering of sampled gyroscope data.

5. The system for enhancing the resolution of detected angular rate information of the ring laser gyroscope of claim 2, wherein:
   said digital filter means for sampling and accumulating angular incremental information further comprises:
   a filter accumulator and an n-sample accumulator;
   a memory having a circular buffer of a predetermined length;
   means for sampling and quantizing angular rate information and combining such information with an output signal from said memory producing a first summed signal;
   providing said first summed signal to said filter accumulator and processing a second signal from said filter accumulator which is a moving average signal to said n-sample accumulator;
   whereby, a moving average signal is accumulated to provide an enhanced resolution signal to a microcomputer for further processing.

6. The system for enhancing the resolution of detected angular rate information of the ring laser gyroscope of claim 2, wherein:
   said digital filter means for sampling and accumulating angular incremental information further comprises:
   means for quantizing and counting the optical output signals indicative of angular rotation from said ring laser gyroscope as sampled quantized data;
   means for adding and accumulating said sampled quantized data at a predetermined sampling rate, said adding and accumulating means providing an enhanced sampling data signal;
   means for combining said enhanced sampling data signal with said sampled quantized data to obtain a resolution enhanced signal, so that a highly resolved incremental angular change may be measured.

7. The system for enhancing the resolution of detected angular rate information of the ring laser gyroscope of claim 1, wherein:
   said ring laser gyroscope is a multioscillator ring laser gyroscope having a multiplicity of operating optical modes, at least a pair of said modes separated from one another by a Faraday frequency spread;
   said multioscillator ring laser gyroscope providing optically integrated angular rate data to said angular increment detecting means, where said integrated angular rate data is quantized into pulses representing fixed angle increments and where said quantized pulses deviate from true integrated angular rate data as characterized by a set of fundamental frequencies and an accompanying set of harmonic frequencies thereof, the harmonic frequencies separated from said fundamental frequencies and one another by a spectrum defined by said Faraday Frequency of said multioscillator ring laser gyroscope;
   said digital filter sampling means defining a moving average filter window, said moving average filter window being a predetermined sampling window for purposely filtering quantized angular rate data from said set of fundamental frequencies, said predetermined sampling window also inherently filtering unwanted quantized angular rate data from said harmonic frequencies due to the aliasing of said harmonic frequencies into said fundamental frequencies;
   said frequency modulated sampling means for sampling the accumulated digital counts at a pre-determined rate is further operatively associated with said digital filter sampling means, such that said frequency modulated sampling means reduces the effect of said unwanted quantized angular rate data due to said harmonic frequencies of the sampled data from said multioscillator ring laser gyroscope before the sampled accumulated digital counts are interpreted to determine an incremental value of an angular measurement;

whereby, an enhanced resolution incremental angular measurement may be achieved by the ring laser gyroscope system.

8. The system for enhancing the resolution of detected angular rate information of the ring laser gyroscope of claim 7, wherein:

said digital filter sampling means further comprises:
an up/down counter;
a high speed adder;
an accumulator operatively associated with said adder;
a microprocessor configured to combine an output of sampled data from said counter with an output of accumulated data from said adder and accumulator, whereby said moving average filter window is defined.

9. The system for enhancing the resolution of detected angular rate information of the ring laser gyroscope of claim 8, wherein:

said frequency modulated sampling means for sampling the accumulated digital counts at a pre-determined rate provides a high frequency sampling rate signal ($F_s$) to said up/down counter and said adder; and, said frequency modulated sampling means provides a lower frequency sampling rate signal ($F_s/N$) to reset said up/down counter and said accumulator, where N is a number setting a predetermined low frequency sampling rate;

whereby, said moving average filter window may filter data which excludes the effects of aliasing and unwanted harmonics from the measured angular increment, so that the filtered data may be interpreted to determine an incremental value of an angular measurement which is characterized by enhanced resolution.

10. The system for enhancing the resolution of detected angular rate information of the ring laser gyroscope of claim 9, wherein:

the high frequency sampling rate ($F_s$) is 10 MHz and the value of N=1000 samples, wherein the low frequency sampling rate ($F_s/N$) is 10,000 KHz.

11. The system for enhancing the resolution of detected angular rate information of the ring laser gyroscope of claim 9, wherein:

the high frequency sampling rate ($F_s$) is 10 MHz and the value of N=5000 samples, wherein the low frequency sampling rate ($F_s/N$) is 2,000 KHz.

12. A method for enhancing the resolution of detected angular rate information in a ring laser gyroscope and inertial guidance system, comprising the steps of:

detecting angular increments from heterodyne optical signal detectors positioned along the optical pathway of said ring laser gyroscope in the form of digital counts which are representative of optically integrated angular rate;

digitally filtering said digital counts through sampling and accumulating angular incremental information as accumulated digital counts;

sampling said accumulated digital counts at a pre-determined rate by the use of frequency modulation such that the effects of aliasing of said accumulated digital counts in said digital filter means is minimized;

whereby, an enhanced resolution of angular and angular rate information is achieved.

13. The method for enhancing the resolution of detected angular rate information in a ring laser gyroscope and inertial guidance system of claim 12, wherein:

said digitally filtering of said digital counts through sampling and accumulating angular incremental information as accumulated digital counts includes the steps of:

filtering said accumulated digital counts through a digital filter window generated by a moving average filter for a predetermined finite time period;
accumulating the sums of said accumulated digital counts and computing the average values of the sums of said accumulated digital counts over said predetermined finite time period.

14. The method for enhancing the resolution of detected angular rate information in a ring laser gyroscope and inertial guidance system of claim 13, wherein:

said digitally filtering of said digital counts further comprises the steps of:
quantizing and counting the optical output signals indicative of angular rotation from said ring laser gyroscope as sampled quantized data;
adding and accumulating said sampled quantized data at a predetermined sampling rate, providing an enhanced sampling data signal;
combining said enhanced sampling data signal with said sampled quantized data to obtain a resolution enhanced signal, so that a highly resolved incremental angular change may be measured.

15. The method for enhancing the resolution of detected angular rate information in a ring laser gyroscope and inertial guidance system of claim 12, wherein:

the step of sampling said accumulated digital counts at a pre-determined rate by the use of frequency modulation further includes:
counting said digital counts for a pre-determined time period at a high frequency sampling rate ($F_s$);
adding and accumulating said counts for a pre-determined time period at said high frequency sampling rate signal ($F_s$);
restarting said counting of said digital counts at a predetermined low frequency modulated sampling rate ($F_s/N$);
latching the added and accumulated digital counts at said pre-determined low frequency modulated sampling rate ($F_s/N$) into a data processor;
combining said digital counts and said accumulated digital counts in said data processor deriving an enhanced angular measure of the rotation of said ring laser gyroscope.

16. The method for enhancing the resolution of detected angular rate information in a ring laser gyroscope and inertial guidance system of claim 15, wherein:

the step of sampling said accumulated digital counts at a pre-determined rate by the use of frequency modulation further includes:
filtering said data to exclude the effects of aliasing and unwanted harmonics from the angular measure, so that the filtered data may be interpreted to determine a changed value of angular measure which is characterized by enhanced resolution.

17. The method for enhancing the resolution of detected angular rate information in a ring laser gyroscope and inertial guidance system of claim 16, wherein:

the step of sampling said accumulated digital counts at a pre-determined rate by the use of frequency modulation further includes:

driving a phase-locked loop to derive said low frequency modulated sampling signal ($F_s/N$) so that aliasing effects on the filtered accumulated data may be removed.

18. The method for enhancing the resolution of detected angular rate information in a ring laser gyroscope and inertial guidance system of claim 17, wherein:

the high frequency sampling rate ($F_s$) is 10 MHz and the value of N=1000 samples, wherein the low frequency sampling rate ($F_s/N$) is 10,000 KHz.

19. The method for enhancing the resolution of detected angular rate information in a ring laser gyroscope and inertial guidance system of claim 17, wherein:

the high frequency sampling rate ($F_s$) is 10 MHz and the value of N=5000 samples, wherein the low frequency sampling rate ($F_s/N$) is 2,000 KHz.

* * * * *